US009458542B2

(12) United States Patent
Suib et al.

(10) Patent No.: US 9,458,542 B2
(45) Date of Patent: Oct. 4, 2016

(54) MATERIALS AND DESIGN FOR AN ELECTROCATALYTIC DEVICE AND METHOD WHICH PRODUCES CARBON NANOTUBES AND HYDROCARBON TRANSPORTATION FUELS

(75) Inventors: Steven L. Suib, Storrs, CT (US); Christopher James Brooks, Dublin, OH (US); Samuel Frueh, Storrs, CT (US); Boxun Hu, Storrs, CT (US); Eric Rolland Kreidler, Pickerington, OH (US)

(73) Assignees: Honda Motor Co., Ltd., Tokyo (JP); University of Connecticut, The, Farmington, CT (US)

( * ) Notice: Subject to any disclaimer, the term of this patent is extended or adjusted under 35 U.S.C. 154(b) by 1025 days.

(21) Appl. No.: 13/430,209

(22) Filed: Mar. 26, 2012

(65) Prior Publication Data
US 2012/0241327 A1 Sep. 27, 2012

Related U.S. Application Data

(60) Provisional application No. 61/467,979, filed on Mar. 26, 2011.

(51) Int. Cl.
*C25B 3/04* (2006.01)
*C25B 1/00* (2006.01)
(Continued)

(52) U.S. Cl.
CPC .............. *C25B 1/00* (2013.01); *B82Y 30/00* (2013.01); *B82Y 40/00* (2013.01); *C01B 31/0226* (2013.01); *C25B 3/04* (2013.01)

(58) Field of Classification Search
CPC ....... B82Y 30/00; B82Y 40/00; Y02E 60/50; H01G 11/36

USPC .............................. 205/462, 628, 633; 429/8
See application file for complete search history.

(56) References Cited

U.S. PATENT DOCUMENTS 4,880,763 A 11/1989 Eri et al.
5,051,156 A 9/1991 Scharifker et al.
(Continued)

FOREIGN PATENT DOCUMENTS

EP 0399833 A1 11/1990
WO 2009/150352 A2 12/2009

OTHER PUBLICATIONS

Guangyu Zhang, David Mann, Li Zhang, Ali Javey, Yiming Li, Erhan Yenilmez, Qian Wang, James P. McVittie, Yoshio Nishi, James Gibbons, and Hongjie Dai, "Ultra-high-yield growth of vertical single-walled carbon nanotubes: Hidden roles of hydrogen and oxygen" PNAS 2005 102 (45) 16141-16145.*
(Continued)

*Primary Examiner* — Arun S Phasge
(74) *Attorney, Agent, or Firm* — Capitol City Tech Law, PLLC; Samuel P. Burkholder

(57) ABSTRACT

The present teachings are directed toward an electrocatalytic cell including a barrier, having at least a first side and a second side opposite the first side, comprising a material permeable to oxygen ions and impermeable to at least $CO_2$, CO, $H_2$, $H_2O$ and hydrocarbons, an electrical power supply in communication with the barrier, a catalyst adjacent the first side of the barrier, a supply of feedstock components in communication with the first side of the barrier, a supply of a carrier gas component in communication with the second side of the barrier; wherein the feedstock components contact the catalyst and react to form hydrocarbon-containing components and oxygen-containing components, and the electrical power supply biases the barrier to thereby conduct oxygen ions from the first side to the second side. Also presented are a device and methods for producing carbon nanotubes.

6 Claims, 12 Drawing Sheets

(51) Int. Cl.
  *B82Y 40/00* (2011.01)
  *B82Y 30/00* (2011.01)
  *C01B 31/02* (2006.01)

(56) References Cited

U.S. PATENT DOCUMENTS

| | | | |
|---|---|---|---|
| 5,064,733 A * | 11/1991 | Krist et al. | 429/489 |
| 6,114,400 A | 9/2000 | Nataraj et al. | |
| 6,517,965 B1 | 2/2003 | Gorer | |
| 7,192,892 B2 | 3/2007 | Ahn et al. | |
| 7,325,392 B2 | 2/2008 | Stancovski et al. | |
| 7,785,728 B2 | 8/2010 | Masel et al. | |
| 8,003,548 B2 | 8/2011 | Yu et al. | |
| 2006/0141153 A1 | 6/2006 | Kubota et al. | |
| 2007/0045125 A1 | 3/2007 | Hartvigsen et al. | |
| 2007/0161717 A1 | 7/2007 | Hu et al. | |
| 2008/0213639 A1 | 9/2008 | Thorel | |
| 2008/0283411 A1 * | 11/2008 | Eastman et al. | 205/343 |
| 2009/0101516 A1 | 4/2009 | Suib et al. | |
| 2009/0134037 A1 | 5/2009 | Stancovski et al. | |
| 2010/0311615 A1 | 12/2010 | Qu et al. | |

OTHER PUBLICATIONS

Graves et al. "Co-electrolysis of CO2 and H2O in solid oxide cells: Performance and durability" Solid State Ionics 192 (2011) 398-403.*
Li et al. "Hollow fibers of yttria-stabilized zirconia (8YSZ) prepared by calcination of electrospun composite fibers" Materials Letters 62 (2008) 2396-2399.*
Meng et al. "Fabrication and characterization of Ni—YSZ anode functional coatings by electron beam physical vapor deposition" Thin Solid Films 517 (2009) 4975-4978.*
Ebbesen et al. "Electrolysis of carbon dioxide in Solid Oxide Electrolysis Cells" Journal of Power Sources 193 (2009) 349-358.*
Jong et al. "Carbon Nanofibers: Catalytic Synthesis and Applications" Catal. Rev.—Sci. Eng., 42(4), 481-510 (2000).*
Novoselova, I.S., et al., "Electrolytic synthesis of carbon nanotubbes from carbon dioxide in molten salts and their characterization.," Physica E—Low-Dimensional Systems and Nanostructures, May 1, 2008, vol. 30, No. 7, pp. 2231-224, Elsevier Science BV, Netherlands.
Kumar, M. and Ando, Y., "Chemical vapor deposition of carbon nanotubes: a review on growth mechanism and mass production," Journal of Nanoscience and Nanotechnology, 2010, vol. 10, No. 6, pp. 3739-3758, American Scientific Publishers, US.
Dundar-Tekkaya, Ezgi, et al., "Production of carbon nanotubes by iron catalyst," World Academy of Science, Engineering and Technology, 2011, vol. 79, pp. 225-231.
Dresselhaus, M.S., et al., "Perspectives on carbon nanotubes and graphene Raman spectroscopy," Nano Letters, Jan. 19, 2010, vol. 10, pp. 751-758, American Chemical Society.
Dresselhaus, M.S., et al., "Raman spectroscopy of carbon nanotubes," Physics Reports, 2004, vol. 409, pp. 47-99, Elsevier B.V.

Nishimura, Kenji, et al., "In situ study of iron catalysts for carbon nanotube growth using X-Ray diffraction analysis," Japanese Journal of Applied Physics, Mar. 19, 2004, vol. 43, No. 4A, pp. L471-L474, The Japan Society of Applied Physics.
Wen, Qian, et al., "Growing 20 cm long DWNTs/TWNTs at a rapid growth rate of 80-90 μm/s," Chem. Mater., Jan. 25, 2010, vol. 22, pp. 1294-1296, American Chemical Society.
Huang, Shaoming, et al., "Metal-catalyst-free growth of single-walled carbon nanotubes on substrates," J. Am. Chem. Soc.,Jan. 21, 2009, vol. 131, pp. 2094-2095, American Chemical Society.
Behr, Michael J., et al., "Effect of hydrogen on catalyst nanoparticles in carbon nanotube growth," J. Appl. Phys., Sep. 13, 2010, vol. 108, pp. 053303-1-053303-8 , American Institute of Physics.
He, Zhanbing, et al., "Iron catalysts for the growth of carbon nanofibers: Fe, Fe3C or Both?," Chemistry of Materials, Nov. 10, 2011, vol. 23, pp. 5379-5387, American Chemical Society.
Kramer, Ryan M., et al., "Constrained iron catalysts for single-walled carbon nanotube growth," Langmuir, Aug. 5, 2005, vol. 21, pp. 8466-8470, American Chemical Society.
Celnik, Matthe, et al., "Modelling gas-phase synthesis of single-walled carbon nanotubes on iron catalyst particles," Carbon, Dec. 15, 2007, vol. 46, pp. 422-433, Elsevier, Ltd.
Gutsev, G. L., et al., "DFT Modeling of SWCNT growth on iron catalysts," Rev. A, 1988, vol. 38, pp. 3098-3100.
Oukaci, Rachid, et al., "Comparison of patented Co F-T catalysts using fixed-bed and slurry bubble column reactors," Applied Catalysis A: General 186, 1999, pp. 129-144, Elsevier Science B.V.
Rytter, Erling, et al., "Catalyst Particle Size of Cobalt/Rhenium on Porous Alumina and the Effect on Fischer-Tropsch Catalytic Performance," Ind. Eng. Chem. Res., Nov. 22, 2007, vol. 46, pp. 9032-9036, American Chemical Society.
Borghard, W. G., et al., "Evaluation of Commercial Catalysts for the Fischer-Tropsch Reaction," Ind. Eng. Chem. Prod. Res. Dev., 1979, vol. 18, No. 1, 1979, pp. 18-26, American Chemical Society, US.
Robert W. Dorner, Dennis R. Hardy, Frederick W. Williams, Burtron H. Davis, and Heather D. Willauer, "Influence of Gas Feed Composition and Pressure on the Catalytic Conversion of CO2 to Hydrocarbons Using a Traditional Cobalt-Based Fischer-Tropsch Catalyst," Energy & Fuels, Jun. 25, 2009, vol. 23, pp. 4190-4195, American Chemical Society.
Kraum, Martin, "Fischer-Tropsch Synthesis on Supported Cobalt-Based Catalysts: Influence of Various Preparation Methods and Supports on Catalyst Activity and Chain Growth Probability," Thesis for obtaining the degree of Doktor der Naturwissenschaften (Dr. rer. nat.) of the Faculty of Chemistry Ruhr-Universität Bochum, 1999, Bochum, Germany.
W. M. Keely and Harry W. Maynor, "Thermal Studies of Nickel, Cobalt, Iron, and Copper Oxides and Nitrates," Journal of Chemical and Engineering Data, Jul. 1963, vol. 8, No. 3, pp. 297-300, American Chemical Society.
PCT, "International Search Report," Jan. 10, 2012, from PCT Appln. No. PCT/US2012/030573 filed Mar. 26, 2012.

* cited by examiner

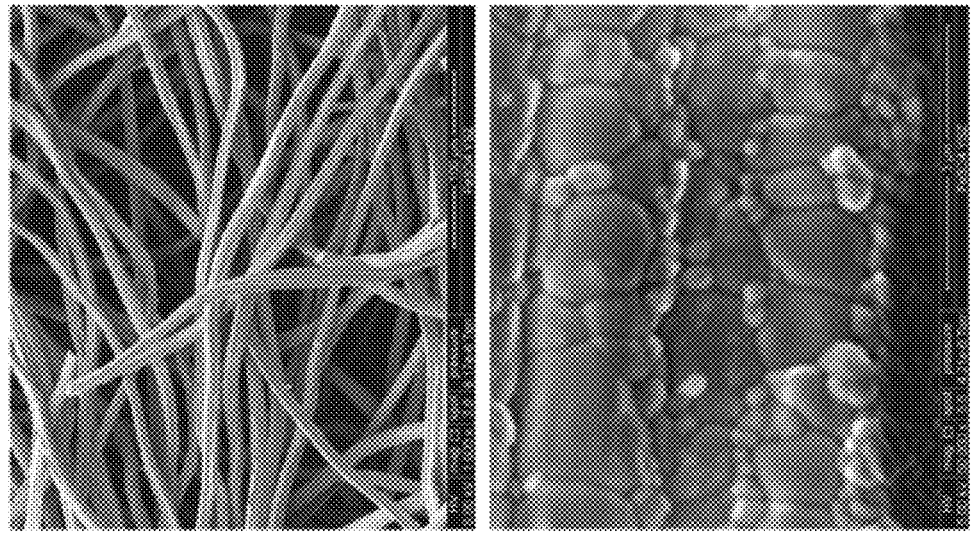
Fig. 12
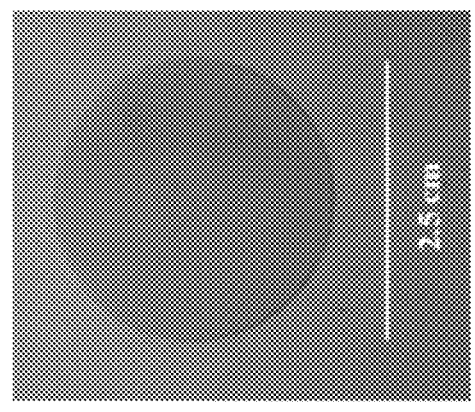
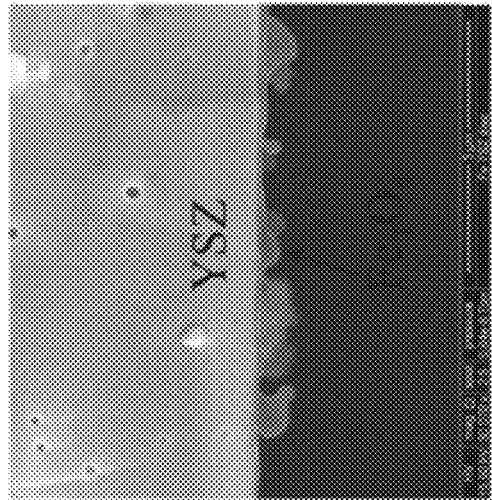

MATERIALS AND DESIGN FOR AN ELECTROCATALYTIC DEVICE AND METHOD WHICH PRODUCES CARBON NANOTUBES AND HYDROCARBON TRANSPORTATION FUELS

RELATED APPLICATIONS

The present application claims benefit from earlier filed U.S. Provisional Application No. 61/467,979, filed Mar. 26, 2011, and is related to U.S. patent application Ser. No. 13/072,683, filed on Mar. 26, 2011, the entire disclosures of which are incorporated by reference for all purposes.

BACKGROUND

1. Field of the Invention

The present teachings are directed to methods of producing carbon nanotubes and hydrocarbons, especially fuels for transportation, and to electrocatalytic cells for performing the methods disclosed herein.

2. Discussion of the Related Art

Various methods of preparing carbon nanotubes are well known, for instance, laser ablation, arc discharge, and chemical vapor deposition. Each of these methods has various shortcomings unique to the method.

Gasification of a carbonaceous source material followed by water gas shift and Fischer-Tropsch chemistry is one commercial method to produce hydrocarbons from the feeds of CO, $CO_2$, $H_2$ and $H_2O$. Fischer-Tropsch ("FT") chemistry typically relies on a syngas feedstock, which is a mixture of carbon monoxide and dihydrogen in an explicitly defined ratio. Typically, feedstocks must contain hydrogen in order for FT chemistry to occur. The difficulties associated with storing and transporting both hydrogen and carbon monoxide result in the carbonaceous source material being gasified in relatively close proximity to a FT plant.

The ability to use as feedstock sources variably composed mixtures of $CO_2$/CO with variable composed mixtures of $H_2$/$H_2O$ for the FT synthesis for liquid hydrocarbon transportation fuels is greatly desirable.

SUMMARY

The present disclosure is directed to an electrocatalytic method of producing carbon nanotubes by providing an electrocatalytic reactor including a supported catalyst and a barrier comprising a material permeable to oxygen ions and impermeable to at least $CO_2$, CO, $H_2$, $H_2O$ and hydrocarbons. There are working and counter electrodes contacted to the supported catalyst. The supported catalyst is then contacted with a carbon-containing feedstock component and a hydrogen-containing feedstock component under electrocatalytic conditions sufficient to reduce the carbon-containing feedstock component, a voltage is applied across the working and counter electrodes, and carbon nanotubes are produced at the surface of the supported catalyst.

The present teachings are also directed to electrocatalytic cell including a barrier which has a first side and a second side opposite the first side, and is composed of a material permeable to oxygen ions and impermeable to at least $CO_2$, CO, $H_2$, $H_2O$ and hydrocarbons. The electrocatalytic cell further includes an electrical power supply in communication with the barrier, a catalyst adjacent the first side of the barrier, a supply of feedstock components in communication with the first side of the barrier, and a supply of a carrier gas component in communication with the second side of the barrier. The feedstock components contact the catalyst and react to form hydrocarbon-containing components and oxygen-containing components, and the electrical power supply biases the barrier to thereby conduct oxygen ions from the first side to the second side, while the hydrocarbon-containing components are collected.

Also taught by the present disclosure is a method for producing hydrocarbons by providing a hydrogen-containing feedstock component and a carbon-containing feedstock component. It is further taught that at least one of the hydrogen-containing feedstock component and the carbon-containing feedstock component comprise oxygen-containing materials. Also taught is an electrocatalytic cell including a catalyst and a barrier made up of a material permeable to oxygen ions and impermeable to at least $CO_2$, CO, $H_2$, $H_2O$ and hydrocarbons. The hydrogen-containing feedstock component and the carbon-containing feedstock component are contacted with one another at the catalyst thereby producing a hydrocarbon component and oxygen ions at the catalyst. The oxygen ions are conducted across the barrier, releasing their electrons to an electrical circuit, and forming dioxygen molecules which are removed from the electrocatalytic cell. The hydrocarbon component is also removed from the electrocatalytic cell.

The presently disclosed method can utilize thermo-catalytic and electro-catalytic materials which vastly expand the nature of precursors or sources which can be used to produce liquid hydrocarbon transportation fuels. Specifically, variably composed mixtures of $CO_2$/CO with variable composed mixtures of $H_2$/$H_2O$ can be used as feedstock materials for liquid hydrocarbon transportation fuels. With the presently disclosed method, liquid hydrocarbon fuels can be generated directly from feedstocks containing only carbon dioxide and water.

Supplementing and extending the range a vessel can operate without the resupply of fuels is one aspect taught by the presently disclosed method. For example, the open ocean contains possible material and energetic sources to the present method of producing hydrocarbon fuels. Ocean water contains carbon dioxide is dissolved therein, typically as a carbonate. Furthermore, solar, wind, and mechanical wave energy are possible energy sources to input into the present method as energetic sources. Nuclear power, if present can also be an energetic source.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 12 is photographs and FESEM images of ALD Fe/YSZ;

DETAILED DESCRIPTION

The presently disclosed electrocatalytic method of producing carbon nanotubes utilizes an electrocatalytic reactor with a barrier comprising a material permeable to oxygen ions and impermeable to at least $CO_2$, CO, $H_2$, $H_2O$ and hydrocarbons, and a supported catalyst with working and counter electrodes contacted to it. The supported catalyst is then contacted with a carbon-containing feedstock component and a hydrogen-containing feedstock component with a voltage across the working and counter electrodes to reduce the carbon-containing feedstock component to produce carbon nanotubes at the surface of the supported catalyst.

The supported catalyst can include at least one catalyst selected from the group consisting of Fe, Cu, Ni, Mn, V, Zn, Co, Fe/Co, alkali metal doped Fe/Co, alkali metal doped Co and mixtures thereof. The support can be selected from yttria-stabilized zirconia supports, reticulated vitreous carbon foam supports, reticulated fibrous silicon carbide supports, zinc oxide foam supports, boron carbide supports, alumina, zirconia, and carbon.

In some cases of the present electrocatalytic method, the supported catalyst can be heated to a temperature sufficient to form carbides. This heating step is particularly desirable with iron and cobalt based catalysts.

The carbon-containing feedstock component can be selected from the group consisting of CO, $CH_4$, $C_2H_2$, and $C_2H_4$, while the hydrogen-containing feedstock component can be made of mixtures of $H_2$ and $H_2O$.

The presently disclosed electrocatalytic method appears to provide increased length SWNTs when the contacting step occurs in an environment comprising 10% hydrogen.

The supported catalyst for the presently disclosed electrocatalytic method can be made by coating a suitable support with layers of a catalyst by atomic layer deposition or physical vapor deposition of the catalyst material. Atomic layer deposition ("ALD") is frequently used in the semiconductor processing industry to form a layer of a metal of a selected thickness onto a substrate or device. This method uses the introduction of one gaseous precursor at a time into a reactor to apply a thin coating onto the target substrate; repetition of the coating cycle provides a means to adjust the thickness of the finished layer.

Physical vapor deposition ("PVD") is also used to deposit thin films of metals onto a substrate by the condensation of a vaporized form of the desired film material. Both deposition techniques described above are well known to those of skill in the art.

Figure 1A:
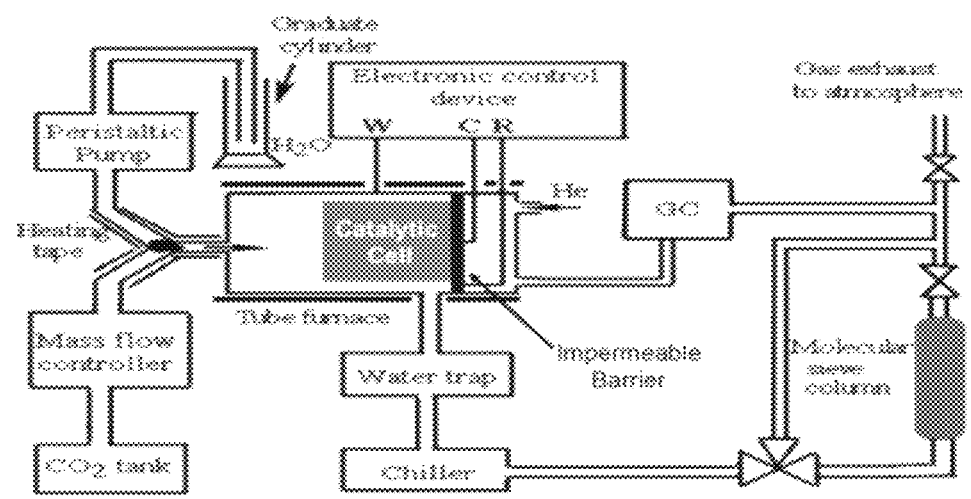
FIGS. 1A and 1B are graphical representations of an electrocatalytic cell for hydrocarbon preparation.
Figure 1B:
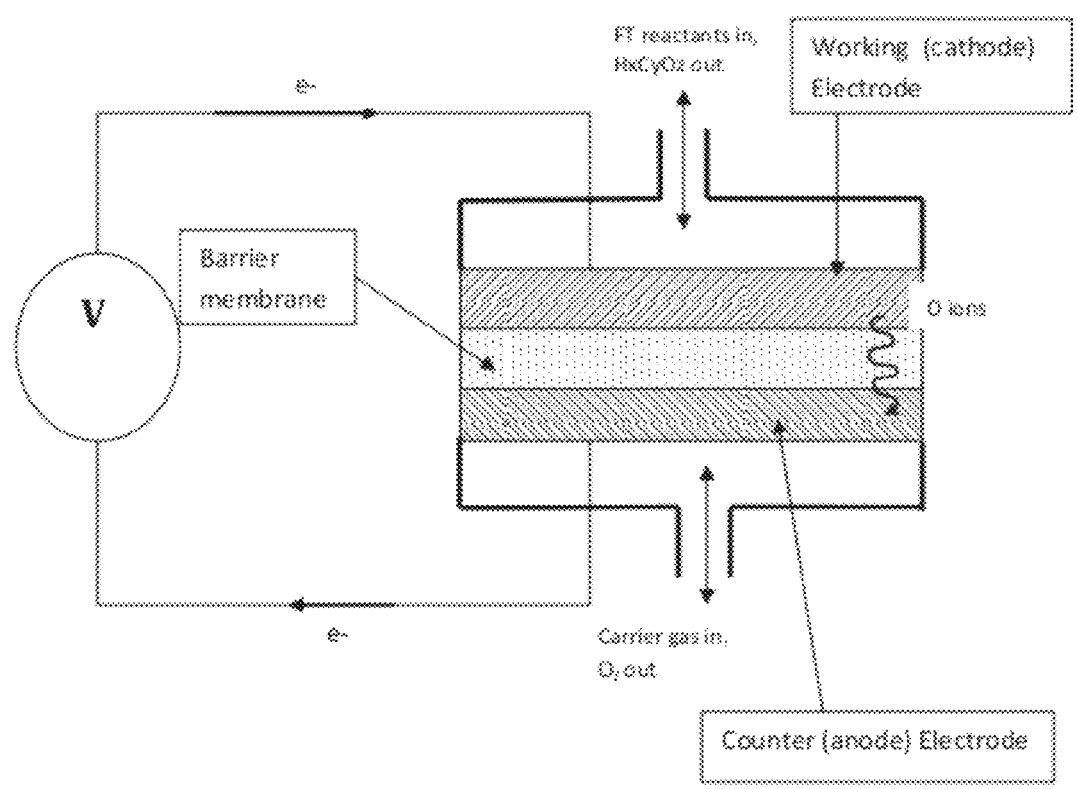
Figure 1C:
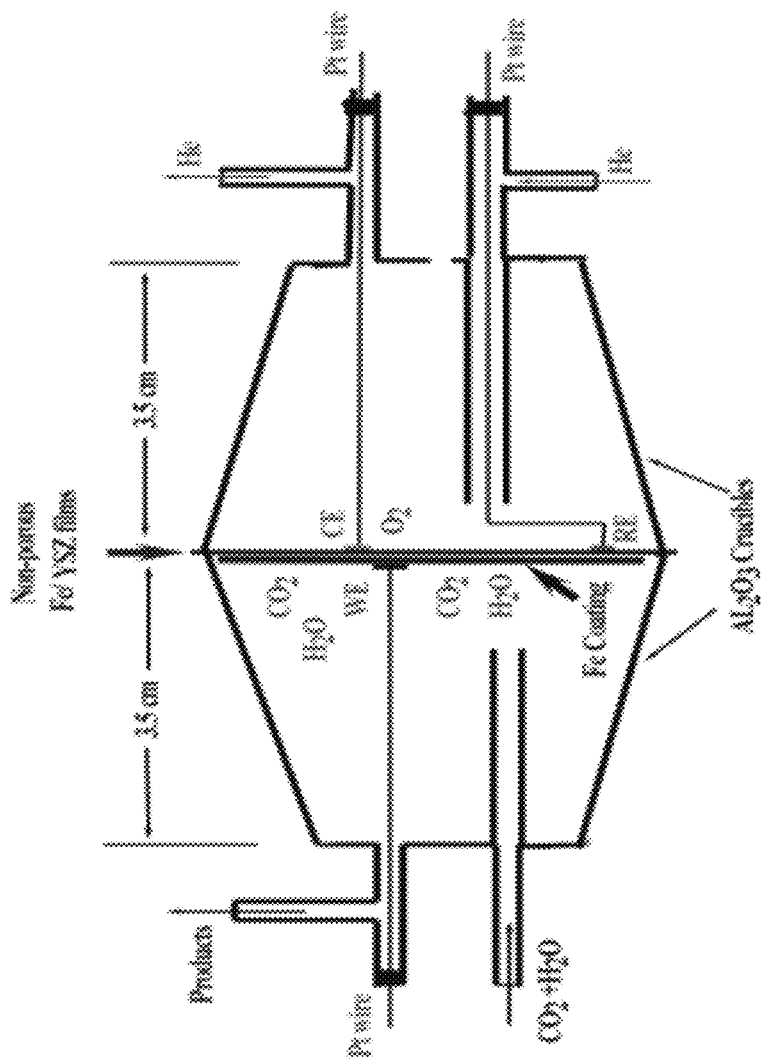
FIG. 1C is a graphical representation of an electrocatalytic reactor for CNT preparation according to the present disclosure.

One embodiment of the present reactor design is illustrated in FIG. 1C, although $Al_2O_3$ is described in FIG. 1C, suitable alternative materials can include quartz and suitable high temperature steels, such as, Ni—Cr containing stainless steels. A suitable reactor would include reactors that can be used at a temperature up to 900° C. In FIG. 1C, WE, CE, and RE represent the working, counter, and reference electrodes, respectively.

The present disclosure is also directed to an electrocatalytic cell comprising a barrier, having at least a first side and a second side opposite the first side, comprising a material permeable to oxygen ions and impermeable to at least $CO_2$, CO, $H_2$, $H_2O$ and hydrocarbons, an electrical power supply in communication with the barrier, a catalyst adjacent the first side of the barrier, a supply of feedstock components in communication with the first side of the barrier, a supply of a carrier gas component in communication with the second side of the barrier; wherein the feedstock components contact the catalyst and react to form hydrocarbon-containing components and oxygen-containing components, and the electrical power supply biases the barrier to thereby conduct oxygen ions from the first side to the second side.

The presently disclosed electrocatalytic cell can be contained within a temperature and pressure controlled manifold. The barrier present in the electrocatalytic cell includes a material with high oxygen ion conductivity, for instance, the barrier is composed of at least one material selected from the group consisting of yttria-stabilized zirconia sheets, reticulated vitreous carbon foam, silicon carbide, and zinc oxide.

The electrocatalytic cell can also have a counter electrode in communication with the electrical power supply on the second side of the barrier. This electrode can be coated with an electrocatalyst selected from the group consisting of noble metals, perovskites, lanthanum strontium manganite, lanthanum strontium iron cobaltite, lanthanum strontium ferrite, lanthanum calcium manganite, lanthanum strontium chromite, and lanthanum strontium gallate magnesite.

The feedstock component can be composed of mixtures of $CO_2$ and CO with mixtures of $H_2$ and $H_2O$; the two mixtures are contacted and react at the catalyst. On the opposite side of the barrier, the carrier gas is present and it can be one or more of hydrogen, helium, argon, nitrogen, and mixtures thereof.

As set forth above, the energy source of the electrical power supply of the electrocatalytic cell can include at least one member selected from the group consisting of fossil fuels, wind, solar, hydroelectric, battery, nuclear, and biomass-produced.

The electrocatalytic cell further comprises a catalyst, as a cathode or working electrode, and selected from the group consisting of Fe, Cu, Ni, Mn, V, Zn, Co, Fe/Co, alkali metal doped Fe/Co, alkali metal doped Co and mixtures thereof. The catalyst can be supported on at least one of the support materials selected from the group consisting of yttria-stabilized zirconia supports, reticulated vitreous carbon foam supports, reticulated fibrous silicon carbide supports, zinc oxide foam supports, boron carbide supports, alumina, zirconia, and carbon. The yttria-stabilized zirconia supports is made up of sheets of yttria-stabilized zirconia microwire structures.

A method for producing hydrocarbons is also disclosed by the present specification. The method has the following steps, providing a hydrogen-containing feedstock component and a carbon-containing feedstock component, providing an electrocatalytic cell comprising a catalyst and a barrier comprising a material permeable to oxygen ions and impermeable to at least $CO_2$, CO, $H_2$, $H_2O$ and hydrocarbons. The hydrogen-containing feedstock component is contacted with the carbon-containing feedstock component at the catalyst, to produce hydrocarbon and oxygen ions at the catalyst, conduct oxygen ions across the barrier whereupon the oxygen ions release their electrons to an electrical circuit, and form dioxygen molecules. The dioxygen molecules are removed from the electrocatalytic cell by a carrier gas. The present method requires that at least one of the hydrogen-containing feedstock component and the carbon-containing feedstock component contains oxygen-containing materials as a source of oxygen for the reaction.

In some embodiments of the presently disclosed method, the carrier gas can include reductants that can react with the oxygen ions, for instance, hydrogen to form water. Any suitable reductant can be included as a component of the carrier gas to then react with the oxygen ions. Nitrogen-containing reductants such as hydrazine and ammonia could be utilized.

The carbon-containing feedstock component can be made up of mixtures of $CO_2$ and CO. In some instances, the carbon-containing feedstock component can include at least one member selected from the group consisting of industrial $CO_2$ byproducts, coal, tar sands, natural gas, carbonate-containing materials, and biomass-derived $CO_2$ products. The hydrogen-containing feedstock component can be composed of mixtures of $H_2$ and $H_2O$.

The method as presently disclosed also includes removing the hydrocarbons produced from the hydrogen-containing feedstock component and the carbon-containing feedstock component at the catalyst from the electrocatalytic cell.

The catalyst in the electrocatalytic cell can be selected from the group consisting of Fe, Cu, Ni, Mn, V, Zn, Co, Fe/Co, alkali metal doped Fe/Co, alkali metal doped Co and mixtures thereof, supported on at least one of the support materials selected from the group consisting of yttria-stabilized zirconia supports, reticulated vitreous carbon foam supports, reticulated fibrous silicon carbide supports, zinc oxide foam supports, boron carbide supports, alumina, zirconia, and carbon. In some instances, the catalyst can be present as a bulk or unsupported catalyst. A suitable bulk catalyst can have the catalytic metal in a concentration ranging from a high of 90% to a low of 30%, a bulk catalyst can also contain about 10 wt. % binder.

The presently taught method uses fundamentally unique materials and chemical process to couple the free energy loss of operating an electric circuit with hydrocarbon producing chemical reactions. The surface and bulk properties of these materials are engineered to provide reaction pathways for interacting feedstock gasses towards useful hydrocarbon products. The present method allows electric power to be an additional control variable that is not encountered in typical thermal based processes.

This method can utilize various sources as material and/or energetic sources to the production of liquid hydrocarbon transportation fuels, for instance, industrial $CO_2$ byproducts, abundant fossil sources, such as coal, tar sands and natural gas, wind, solar, hydro, and nuclear power, and biomass which can all be viewed as possible energetic and material sources to liquid hydrocarbon transportation fuels.

As set forth in FIG. 1A, a schematic of how the presently disclosed electrocatalytic cell operates in a continuous lab scale reactor. The carbon and hydrogen-containing feedstocks are introduced to one side of a temperature and pressure controlled manifold. A carrier gas, in this case, helium, is introduced into the other side of the manifold. The two sides are physically separated by an impermeable barrier. The barrier, however has high oxygen ion conductivity. The surface properties and composition of the barrier are also selected to facilitate surface interactions with the incoming feedstock gasses and intermediate species. When the barrier is biased with an electric voltage from the electronic control unit, oxygen atoms, originally present in the carbon dioxide and water, are conducted through the barrier as oxygen ions. On the helium side of the barrier, the oxygen ions release their electrons to the electrical circuit and are carried away as dioxygen by the helium carrier gas. On the feedstock side, hydrocarbons are formed by the interactions of carbon and hydrogen on the surface of the catalyst, labeled as "catalytic cell", which can be a supported or bulk catalyst. These produced hydrocarbons are carried away by bulk flow, and collected for use and/or analysis.

As schematically diagrammed in FIG. 1B, the electrocatalytic cell can have a working or cathode electrode in communication with the electrical power supply on the first side of the barrier. The working electrode of the electrical circuit can include a catalyst coating or deposition active for the Fischer-Tropsch reaction. Here, the Fischer-Tropsch reaction occurs producing the desired $H_xC_yO_z$ product and oxygen ions which are in turn transported across the membrane or barrier to the counter electrode. In some embodiments, the counter electrode can be coated with an electrocatalyst selected from the group consisting of noble metals, perovskites, lanthanum strontium manganite, lanthanum strontium iron cobaltite, lanthanum strontium ferrite, lanthanum calcium manganite, lanthanum strontium chromite, and lanthanum strontium gallate magnesite. Preferably the counter electrode electrocatalyst formulation is active for oxygen ion recombination to form dioxygen when in the presence of an inert gas, such as helium.

In some examples of the presently disclosed electrocatalytic cell and method, the carrier gas can also include a gas reactive with oxygen ions, such as hydrogen. In such a case, the oxygen ions would react with hydrogen to form water on the second side of the barrier. The presence of a counter electrode coated with an electrocatalyst formulation can be used to speed the kinetics of the oxygen ion recombination.

The presently disclosed method and electrocatalytic cell can utilize various material formulations which are active for the Fischer-Tropsch synthesis. This disclosure sets forth several different types of possible cell materials which possess properties which make them active FT catalysts. By active FT catalyst is meant that electricity is not required in order to produce hydrocarbons from syngas feedstocks. However, in some embodiments, they can be incorporated into the electrocatalytic cell to enhance their functionality.

Figure 2:
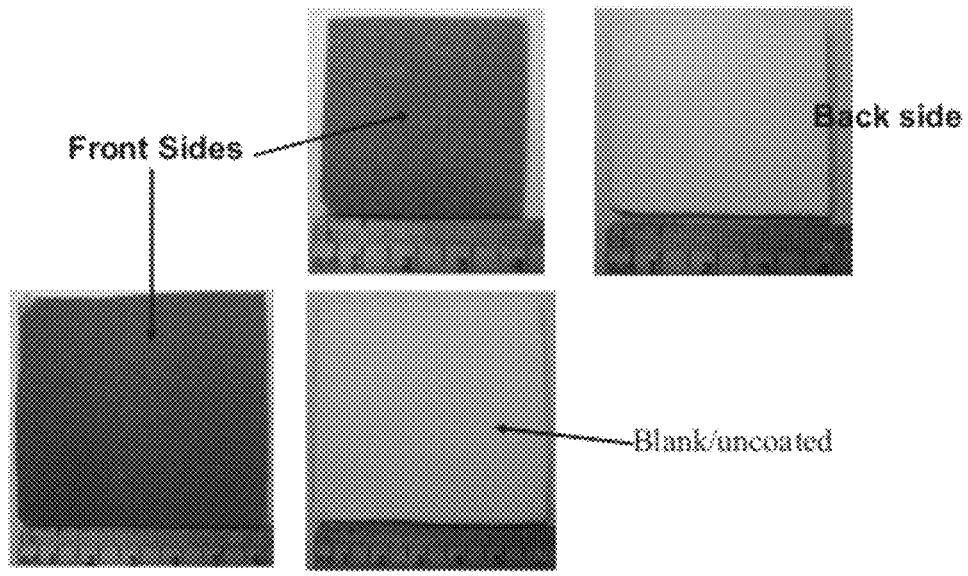
FIG. 2 is photographs of sheets of YSZ.
Figure 3:
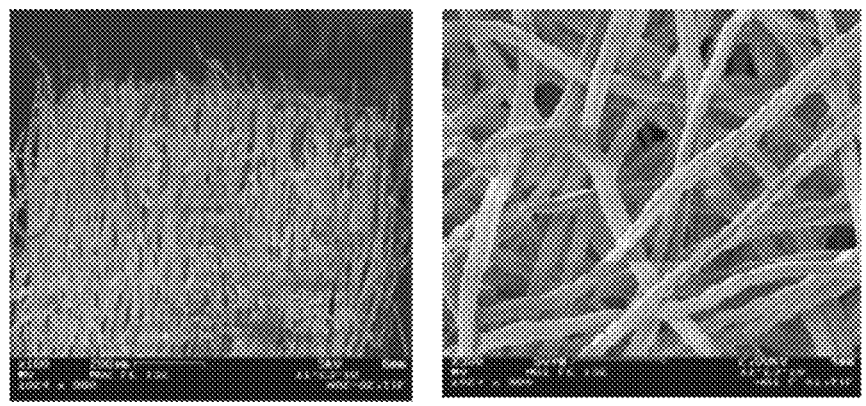
FIG. 3 is FESEM images.
Figure 4:
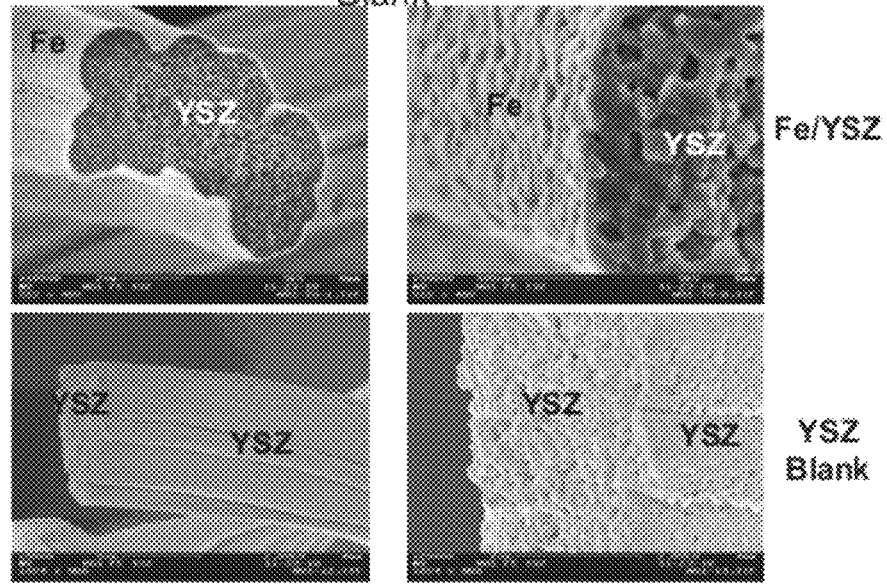
FIG. 4 is FESEM images of uncoated and Fe coated YSZ microwires.

In some embodiments of the presently disclosed teachings, a catalyst composed of Fe, Cu, Ni, Mn, V, Zn, Co, Fe/Co, alkali metal doped Fe/Co, alkali metal doped Co and mixtures thereof, and other systems derived from Fe/Co supported on sheets of yittria-stabilized zirconia ("YSZ"). These sheets are composed of YSZ microwires. FIGS. 2 and 3 are photographs of the sheets, and FESEM images of the microwire structure of the sheet, respectively. FIG. 2 shows both the side coated with a Fe-based catalyst composition, and the blank uncoated back side of the sheet. FIG. 3 shows the microwire structure prior to high temperature calcination at a temperature of about 1600° C. to avoid a gas leaking between the working and counter electrode of the cell. FIG. 4 shows FESEM images of uncoated and Fe coated YSZ microwires. These images appear to show that the Fe material is deposited on the surface of the microwire.

Figure 5:
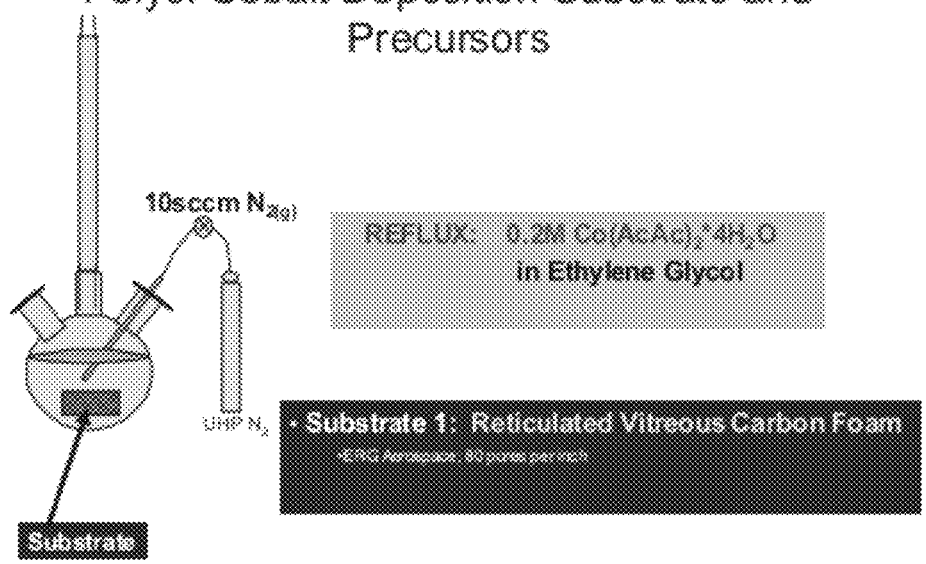
FIG. 5 illustrates a deposition process for RVC foam.
Figure 6:
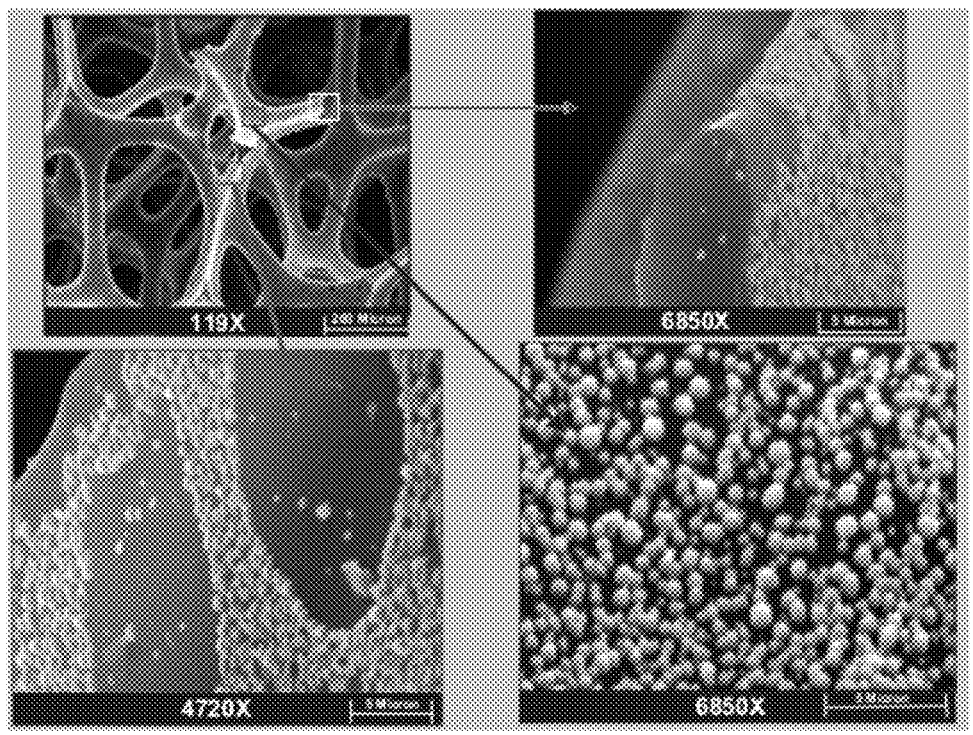
FIG. 6 is FESEM images of a RVC foam.
Figure 7:
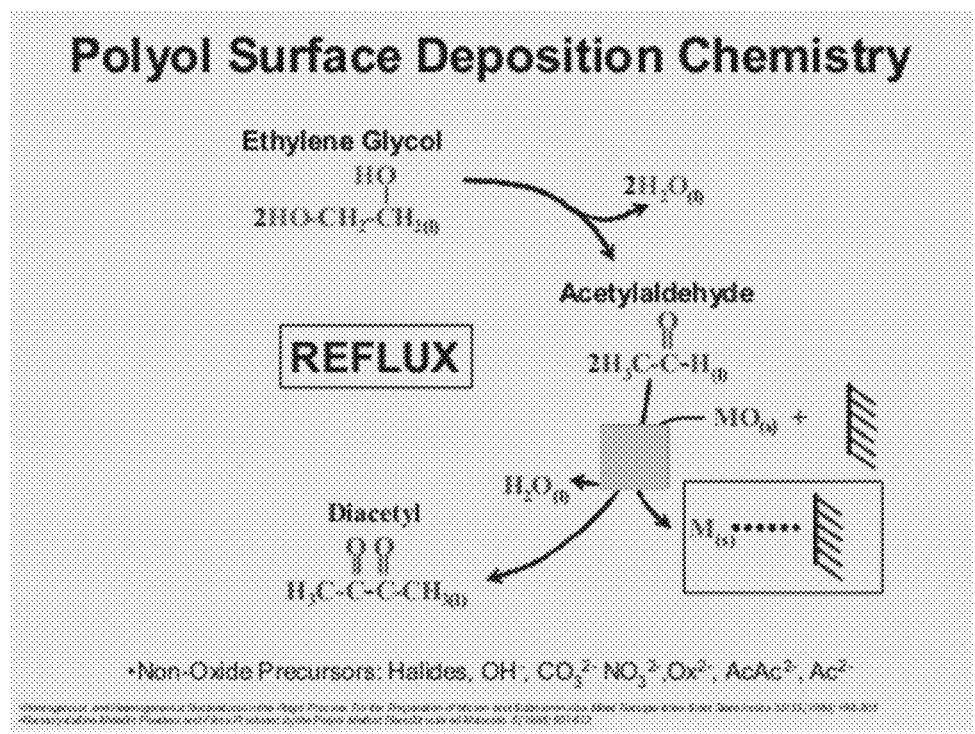
FIG. 7 is a reaction sequence.

In other embodiments of the presently disclosed teachings, the cell material can be composed of a reticulated vitreous carbon ("RVC") foam based material. Vitreous carbon is otherwise known as diamond-like or glassy carbon, and is commercially available as Doucel® foam products from ERG Materials and Aerospace Corp. of Oakland, Calif. FIG. 5 illustrates a process to deposit an active phase, in this case cobalt, onto the RVC foam by refluxing in a solution containing a Co(acac)$_2$ precursor. FIG. 6 shows FESEM images showing the interior structure of the RVC foam with the cobalt deposited on the surface. FIG. 7 shows the reaction sequence that deposits the cobalt onto the RVC foam.

Figure 8:
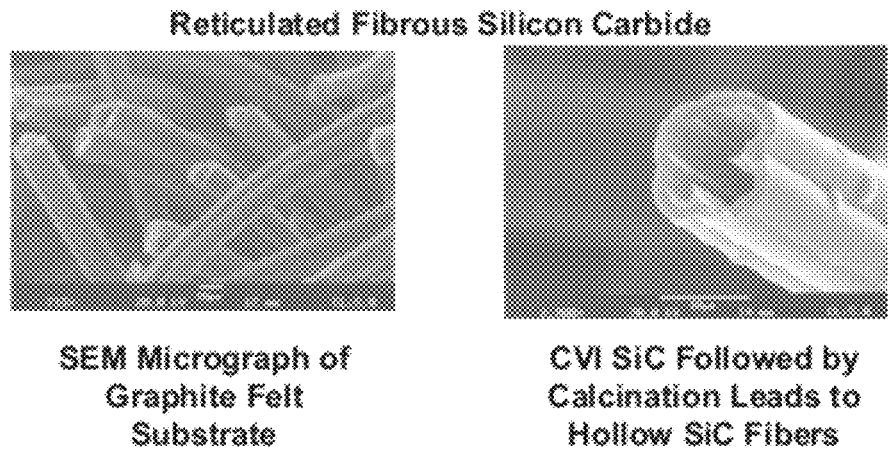
FIG. 8 is SEM micrographs of SiC fibers.

In another embodiment of the presently disclosed teachings, the cell material can be composed of a reticulated fibrous silicon carbide system ("SiC"). The SiC system can be modified by the deposition and infiltration of active phases within and around the free standing hollow tube foam of SiC. The SiC foam can undergo chemical vapor infiltration to deposit the desired metal onto the surface of the SiC foam. FIG. 8 shows SEM micrographs of the initial felt substrate and then the hollow SiC fibers that are produced after calcination.

Figure 9:
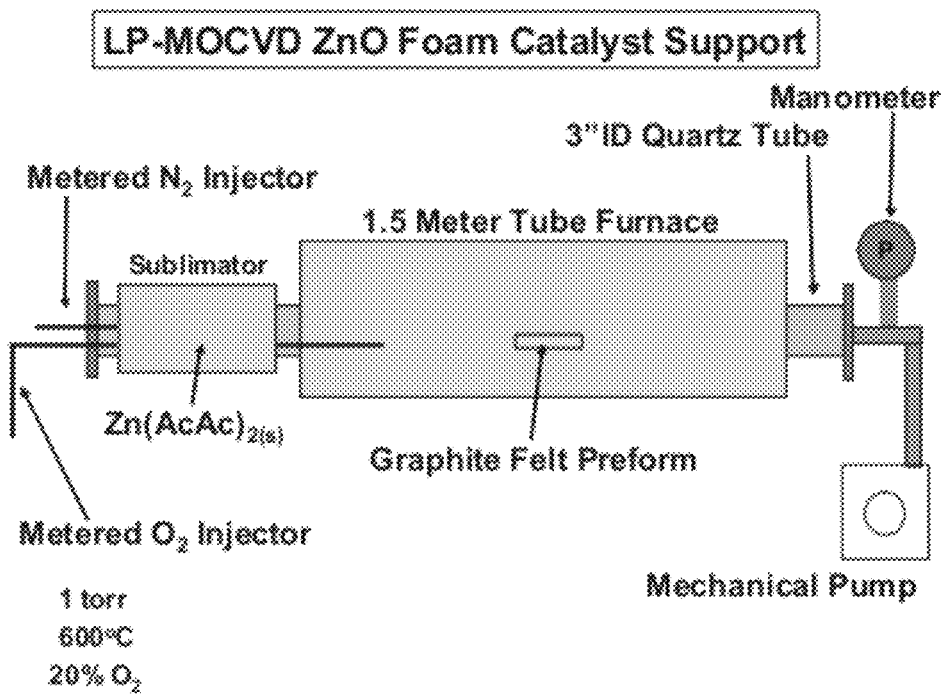
FIG. 9 illustrates a schematic of the equipment and parameters for the preparation of the ZnO foam support system.

In yet another embodiment of the presently disclosed teachings, the cell material can be a zinc oxide foam system similar to the SiC system. FIG. 9 illustrates the equipment and parameters for the preparation of the ZnO foam support system. The ZnO foam support system can then undergo chemical vapor infiltration similar to the SiC system to deposit the desired metal onto the surface of the ZnO foam.

Thermal CVD, also known as chemical vapor deposition or chemical gas-phase growth method, can be used in the presently disclosed methods, although alternative methods including microwave plasma CVD and laser vapor deposition can be utilized.

Figure 10:
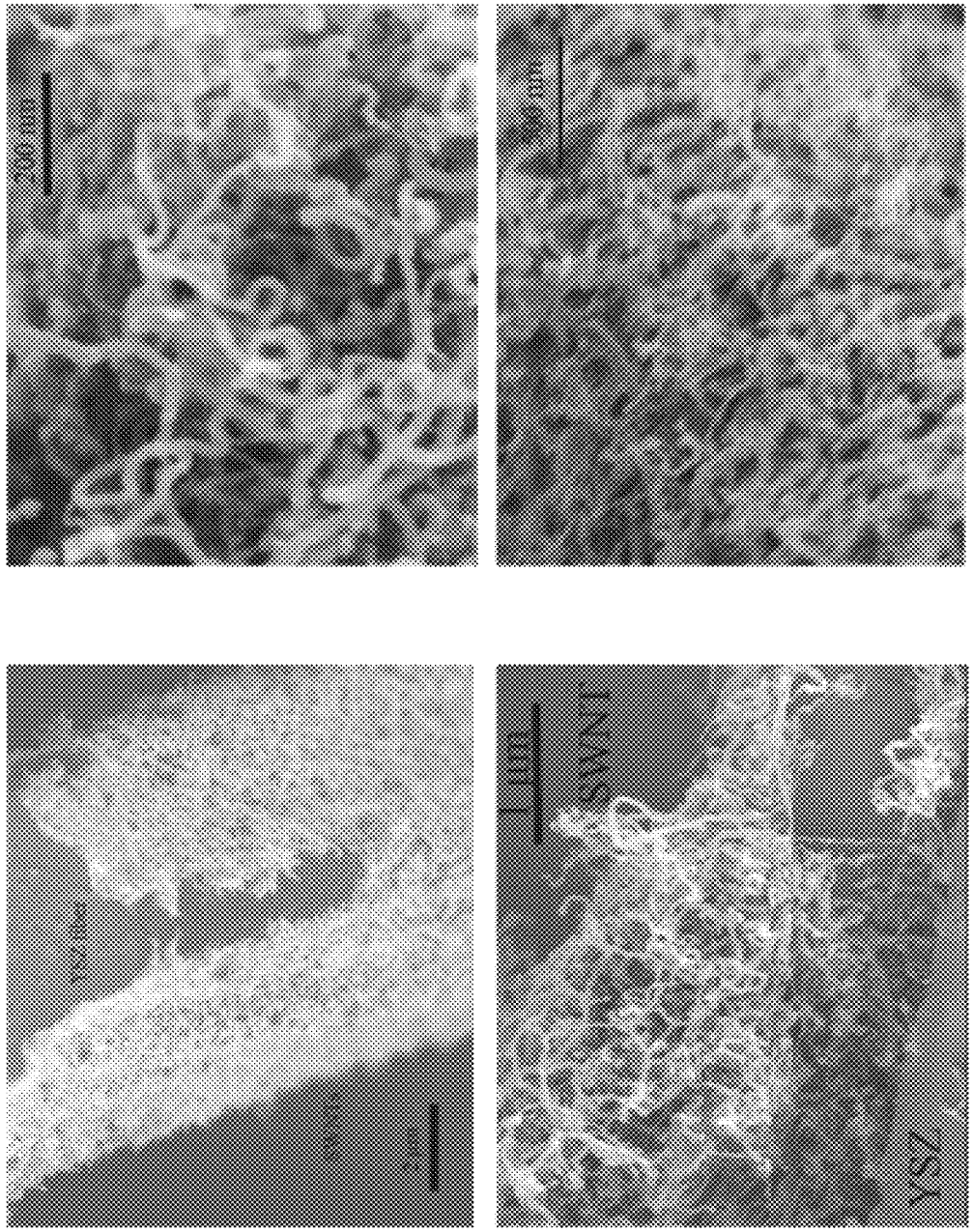
FIG. 10 is FESEM images of carbon nanotubes on ALD Fe/YSZ.
Figure 11:
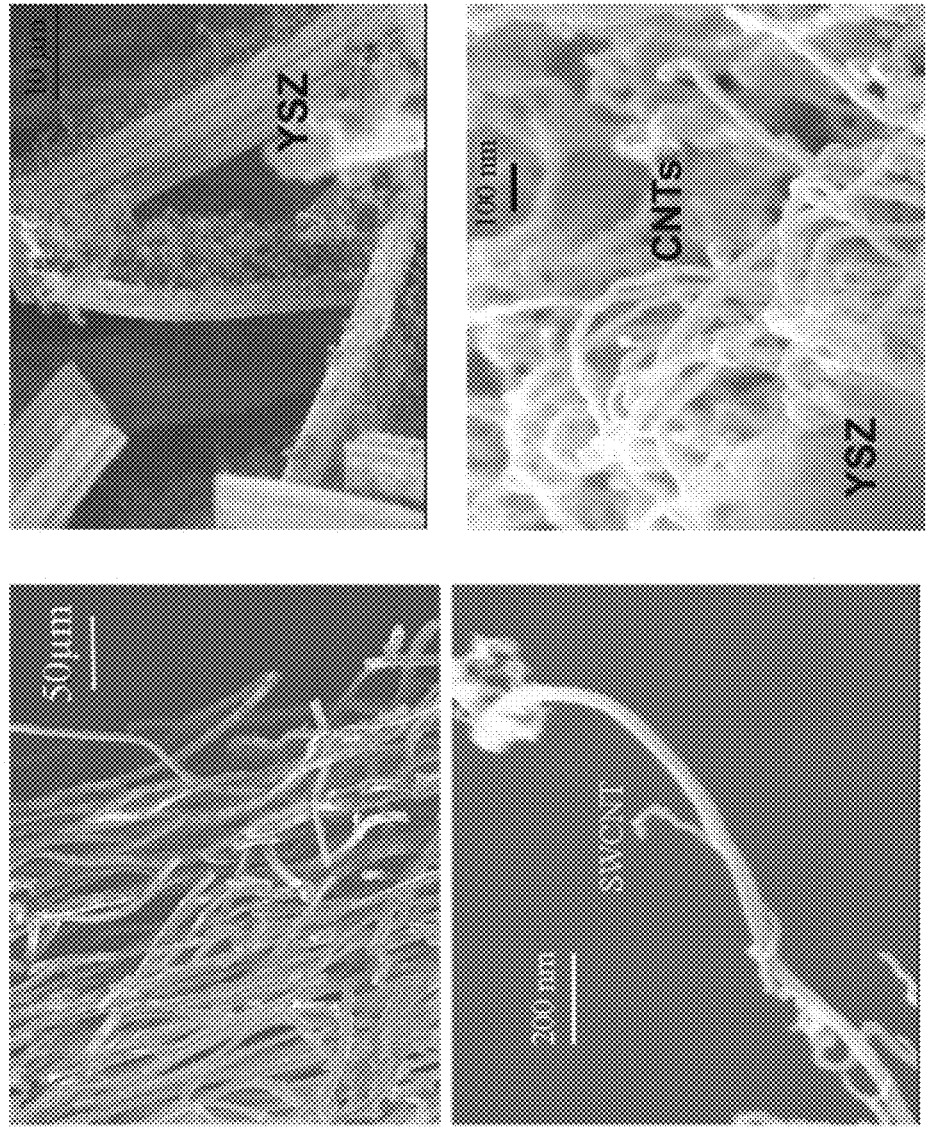
FIG. 11 is FESEM images of carbon nanotubes on PVD Fe/YSZ.

As seen in FIGS. 10 and 11, comparing ALD coated and PVD coated Fe on yttria-stabilized zirconia supports, the ALD coatings of Fe on YSZ supports are seen here as more uniform and thinner than PVD coatings of Fe on YSZ supports. As a result, the carbon nanotubes formed on ALD Fe coatings were more uniform and thinner than with PVD coated Fe.

Experimental Details

The materials used in the experiments described herein were obtained from the following vendors as set forth below. The zirconia felt was type ZYF-50, 100, 150 obtained from Zircar Zirconia, Inc. The 2.5 cm diameter disks of YSZ were from fuelcellmaterials.com, and the Ceramabond 835 was from Aremco products, Inc. Alfa Aesar and Fisher Scientific were the sources for the Fe, Co metal powers and Fe(acac)$_3$, Pt wires, and other chemicals. Special high temperature stainless tubes and parts from Arch City Steel.

The laboratory equipment utilized in the preparation and measurements described herein were as follows:
a. PVD equipment: DV-502 Denton Vacuum and coating system.
b. ALD equipment: Savannah S100 (Cambridge NanoTech).
c. Impedance: Reference 600 potentiostat/galvanostat (Camary Instrument).
d. GC: SR18610C.
e. FESEM: Zeiss DSM 982 Gemini FESEM instrument with a Schottky emitter.
f. HRTEM: JEOL 2010 FasTEM.
g. FTIR-Raman: Nicolet 8700 research grade FTIR with Raman spectrometer.
h. Dispersion Raman: Renishaw 2000 spectrometer Ramanscope.
i. XRD: Scintag XDS 2000 X-ray diffractometer.

For the ALD coated catalysts described herein, the coating conditions were typically to have support heated to a temperature of 300° C., with a precursor temperature of 180° C., and the number of coating cycles varied from 100 to 300 depending on the desired thickness of the final coated layer. These ALD coated samples typically had carbon deposits after preparation, and those carbon deposits were burned off in air at 600° C. before the catalysts were used for the synthesis of CNTs. SEM-EDX confirmed the existence of carbon, which are the large particles shown in FIG. 12.

For the PVD coated catalysts, the coating conditions were typically to set the vacuum at <10$^{-5}$ bar, current at a range of 30-40 A, with a voltage ranging from 60 to 70 V. Deposition time varied from 1 to 15 minutes.

For the carbon nanotube synthesis conditions described herein, the reactants were typically CO and H$_2$. Typical concentrations were 10% CO/10% H$_2$ in the preparations according to the present disclosure. 30% CO as a reactant concentration tended to lead to the formation of more amorphous carbon as opposed to the desired CNTs. The list of possible reactants would include $CH_4$, $C_2H_2$, and $C_2H_4$. Reaction temperatures varied from 500 to 1000° C.

Fe, Fe$_3$O$_4$, and iron carbide catalysts (Fe$_3$C) are some of the catalyst formations that were utilized to prepare CNTs. Under the above-described CVD method, Fe catalysts showed highest activity for the synthesis of CNTs. Under the electrocatalysis method according to the present disclosure, Fe$_3$C can be an active catalyst for the synthesis of CNTs at relative low temperatures, that is, 550 to 750° C.

For the CVD preparation method of SWNTs, the support was typically heated to a temperature ranging between 600 and 1000° C., and He purges were conducted before and after CVD, with a H$_2$/He reduction before CVD. Carbon sources for the CVD preparation of SWNTs can include CO, $C_2H_2$ and $C_2H_4$. A typical gas mixture can include 5 to 33% CO, 10 to 40% H$_2$ with the balance He.

Figure 13:
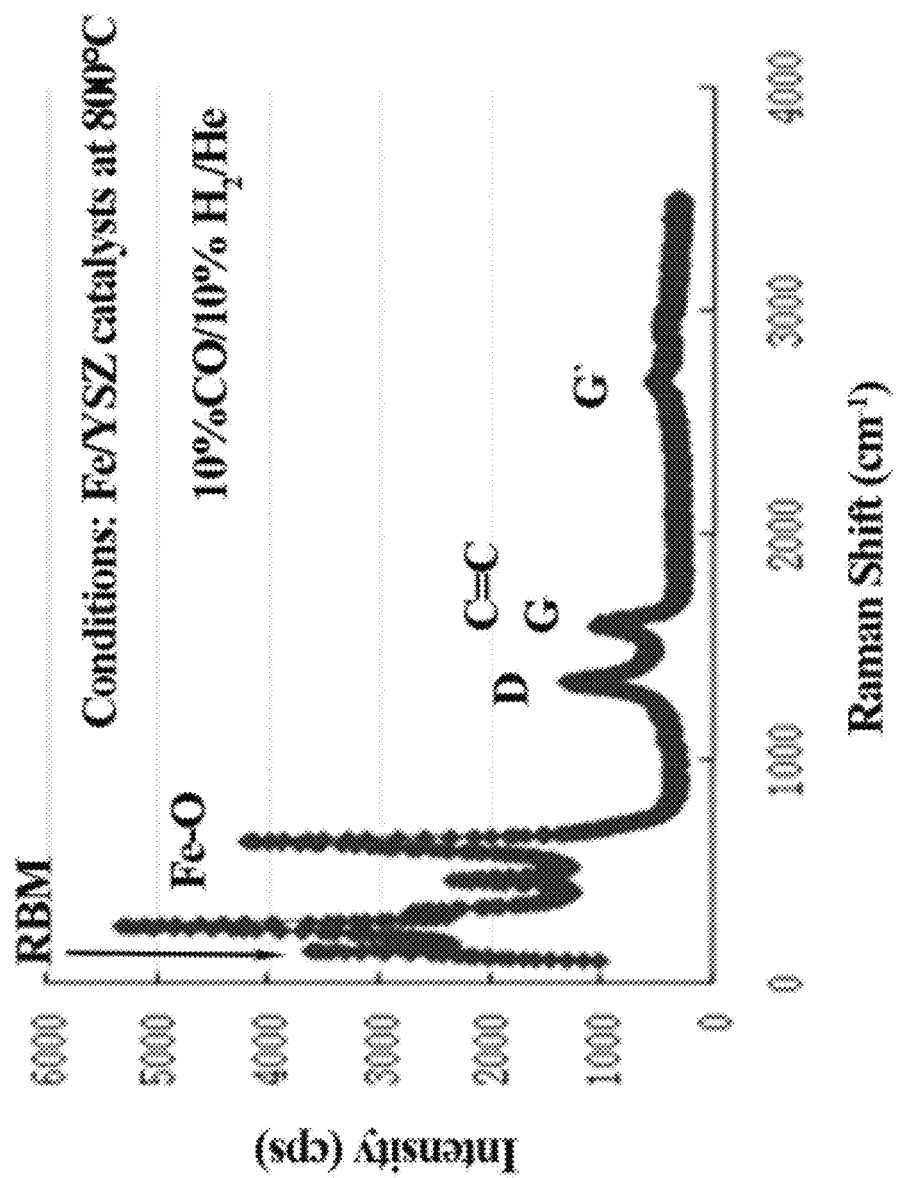
FIG. 13 is Raman spectra of carbon nanotubes prepared by PVD Fe/YSZ.
Figure 14:
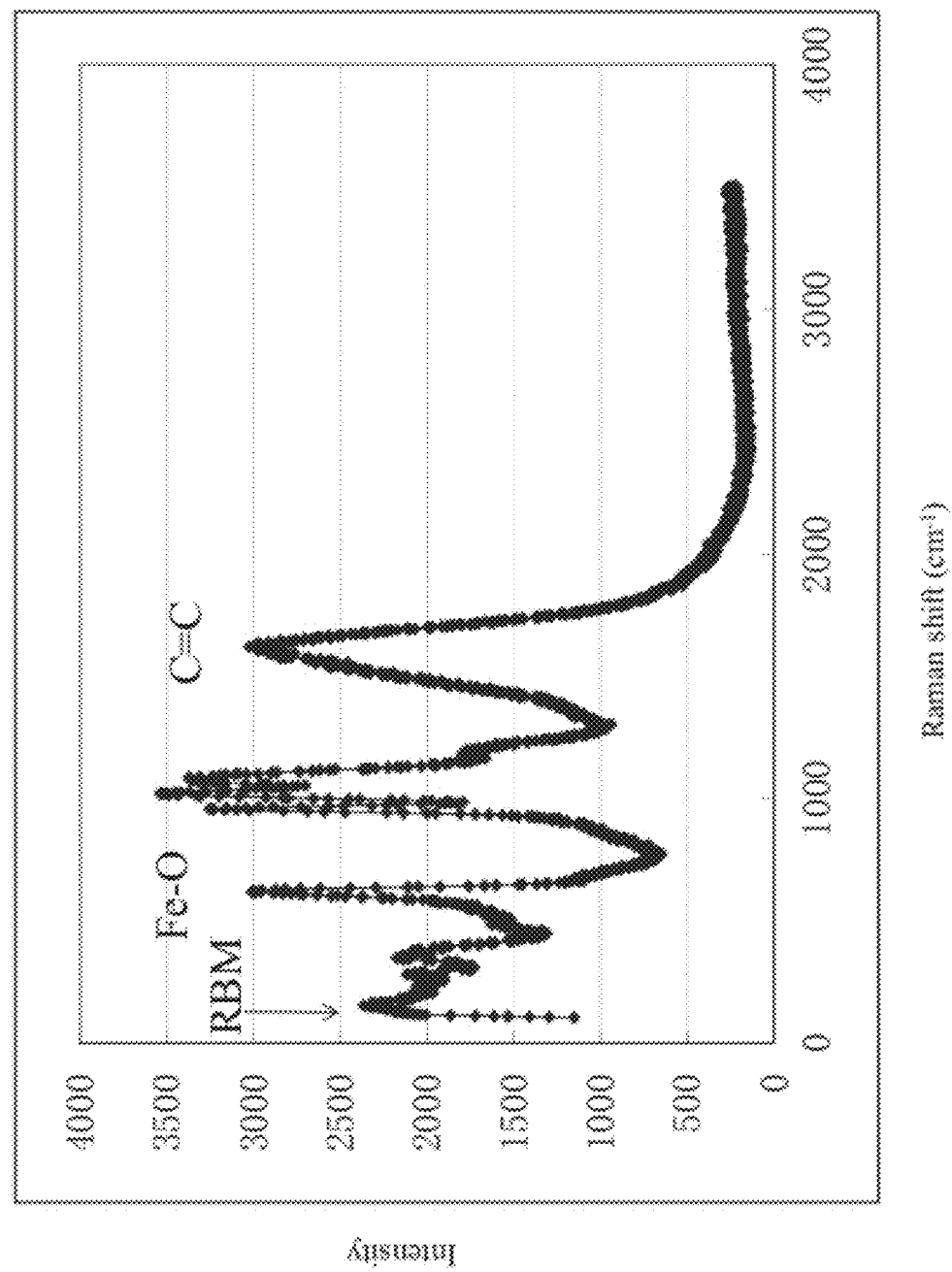
FIG. 14 is Raman spectra of carbon nanotubes prepared by ALD Fe/YSZ.

FIG. 13 illustrates the Raman spectra of CNT products prepared by PVD coated Fe on a YSZ support. Here, the RBM and G' features confirm the existence of SWNTs, and the ratio of D/G indicates the presence of multiwall carbon nanotubes ("MWNT"s). FIG. 14 illustrates the Raman spectra for CNT products synthesized using ALD coated Fe on a YSZ support, with the RBM feature of SWNTs observed.

The presently disclosed electrocatalysis methods have been utilized to produce gram scale carbon nanotubes product, typically a powder. The yield of the electrocatalysis method is higher, about five times higher, than CVD method. Additionally, in some embodiments of the present CVD method, CNT coatings with overall thickness in the nanometer range were observed.

The optimal temperature for production of high quality SWNTs coatings using CVD and electrocatalysis method is about 900° C.

The presence of hydrogen during the synthesis is seen to increase the SWNT length. The growth speed of SWNTs was 100-150 nm/h for CVD using Fe catalysts and 10% CO and 10% H$_2$.

For the examples shown in FIGS. 10 and 11, where ALD and PVD Fe/YSZ, respectively, were used as the electrocatalyst in a reactor as illustrated in FIG. 1C, the reaction parameters included a reactant mix of CO at 10 v %, H$_2$ at 10 v %, He as the balance, temperatures ranging from 550 to 1000° C. for mixed carbon nanotube products, with an optimal temperature of 900° C. for production of SWNT. With higher concentrations of CO, higher yields of CNTs have achieved. The increased concentration of CO also affected the distribution of carbon nanotubes, at higher CO concentrations, for example, 30 v %, more multiwall carbon nanotubes and less SWNT were produced.

The typical total gas flow rate range: 80-500 sccm, depend on sample size, typical 120 sccm, with a reaction pressure of 1 atmosphere.

In FIGS. 13 and 14, where ALD and PVD Fe/YSZ, respectively, were used as the electrocatalyst in a reactor as illustrated in FIG. 1C, the following reaction conditions were applied, reactants: CO: 10 v %, $H_2$ 10 v %, He as the balance, temperature of 800° C., total gas flow rate: 80 sccm, and total pressure of 1 atmosphere. The carbon-containing products were then analyzed by Raman spectroscopy as presented in FIGS. 13 and 14.

All publications, articles, papers, patents, patent publications, and other references cited herein are hereby incorporated by reference herein in their entireties for all purposes.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. An electrocatalytic method of producing carbon nanotubes, comprising
    providing an electrocatalytic reactor comprising a supported catalyst and a barrier comprising a material permeable to oxygen ions and impermeable to at least $CO_2$, CO, $H_2$, $H_2O$ and hydrocarbons;
    contacting working and counter electrodes to the supported catalyst;
    contacting the supported catalyst with a carbon-containing feedstock component comprising at least one member selected from the group consisting of CO, $CH_4$, $C_2H_2$, and $C_2H_4$, and a hydrogen-containing feedstock component under electrocatalytic conditions sufficient to reduce the carbon-containing feedstock component;
    applying a voltage across the working and counter electrodes and thereby biasing the barrier,
    heating the supported catalyst to a temperature ranging from 600 to 1000° C., and
    producing carbon nanotubes at the surface of the supported catalyst,
    producing dioxygen at a side of the barrier opposite the supported catalyst, and
    removing dioxygen from the electrocatalytic reactor,
    wherein the barrier is sufficiently biased to conduct oxygen ions from a first side where the supported catalyst contacts with the carbon-containing feedstock component and the hydrogen-containing feedstock component to the side of the barrier opposite the supported catalyst.

2. The electrocatalytic method according to claim 1, wherein the supported catalyst comprises at least one catalyst selected from the group consisting of Fe, Cu, Ni, Mn, V, Zn, Co, Fe/Co, alkali metal doped Fe/Co, alkali metal doped Co and mixtures thereof.

3. The electrocatalytic method according to claim 1, wherein the supported catalyst comprises a catalyst supported on at least one support selected from the group consisting of yttria-stabilized zirconia supports, reticulated vitreous carbon foam supports, reticulated fibrous silicon carbide supports, zinc oxide foam supports, boron carbide supports, alumina, zirconia, and carbon.

4. The electrocatalytic method according to claim 1, wherein the hydrogen-containing feedstock component comprises mixtures of $H_2$ and $H_2O$.

5. The electrocatalytic method according to claim 1, wherein the contacting the supported catalyst with the carbon-containing feedstock component and a hydrogen-containing feedstock component occurs in an environment comprising 10% hydrogen.

6. The electrocatalytic method according to claim 1, wherein the supported catalyst comprises a support coated with a catalyst by atomic layer deposition or physical vapor deposition of the catalyst material.

\* \* \* \* \*